United States Patent
Kerr, Jr.

(10) Patent No.: US 6,799,982 B2
(45) Date of Patent: Oct. 5, 2004

(54) QUICK CONNECT DEVICE FOR ELECTRICAL FIXTURE

(75) Inventor: Jack Russell Kerr, Jr., College Station, TX (US)

(73) Assignee: Angelo Fan Brace Licensing, L.L.C., Philadelphia, PA (US)

( * ) Notice: Subject to any disclaimer, the term of this patent is extended or adjusted under 35 U.S.C. 154(b) by 50 days.

(21) Appl. No.: 10/293,883

(22) Filed: Nov. 13, 2002

(65) Prior Publication Data

US 2003/0060067 A1 Mar. 27, 2003

Related U.S. Application Data

(63) Continuation-in-part of application No. 10/156,919, filed on May 28, 2002, now Pat. No. 6,503,099.
(60) Provisional application No. 60/295,186, filed on Jun. 1, 2001.

(51) Int. Cl.[7] .................................................. H01R 13/62
(52) U.S. Cl. ........................ 439/180; 439/537; 439/140
(58) Field of Search ................................ 439/537, 140, 439/313–314, 316, 318, 333, 180

(56) References Cited

U.S. PATENT DOCUMENTS

| | | | |
|---|---|---|---|
| 484,911 A | 10/1892 | Green | |
| 969,409 A | 9/1910 | Russell | |
| 1,030,007 A | 6/1912 | Miller | |

(List continued on next page.)

FOREIGN PATENT DOCUMENTS

| | | |
|---|---|---|
| CH | 223834 | 12/1942 |
| DE | 456372 | 2/1928 |
| FR | 674.956 | 2/1930 |
| FR | 1 167 763 | 11/1958 |
| FR | 1.331.492 | 6/1965 |
| GB | 182097 | 8/1923 |
| GB | 1073791 | 6/1967 |
| GB | 2 149 013 A | 6/1985 |
| JP | 5-157092 A | 6/1993 |

OTHER PUBLICATIONS

Foreign patent document No. 2299 of 1905, United Kingdom, filed Jan. 1906.

Foreign patent document No. 2481 of 1908, United Kingdom, filed May 1908.

Foreign patent document No. 6867 of 1914, United Kingdom, filed Mar. 1915.

*Primary Examiner*—Michael C. Zarroli
(74) *Attorney, Agent, or Firm*—Drinker Biddle & Reath LLP

(57) ABSTRACT

A ceiling fan or light fixture is provided with a sliding support member that slides horizontally into a support channel attached to a ceiling box. An electrical plug and receptacle attached to the two support members automatically mate as the two support members are slid together. A bell is then raised to cover the two support members and prevent them from sliding apart. The sliding support member is held above the bell by telescopic standoffs with a frictional action. A screw is captive within each standoff. As the bell is raised, the part of each standoff fixed to the bell slides upwards until its upper end positions the tip of the screw just in front of a threaded hole in the fixed support channel. Fastening the screws into the threaded holes then both locks the sliding mechanism and attaches the bell directly to the fixed support channel.

28 Claims, 4 Drawing Sheets

U.S. PATENT DOCUMENTS

| | | | |
|---|---|---|---|
| 1,222,837 A | 4/1917 | Winslow et al. | |
| 1,361,785 A | 12/1920 | Tucker | |
| 1,486,896 A | 3/1924 | Hubbell | |
| 1,506,522 A | 8/1924 | Gansel | |
| 1,583,864 A | 5/1926 | Tucker | |
| 1,595,972 A | 8/1926 | DeReamer | |
| 1,636,278 A | 7/1927 | Benjamin | |
| 1,646,806 A | 10/1927 | Benjamin | |
| 1,666,223 A | 4/1928 | Symmes | |
| 1,666,411 A | 4/1928 | D'Olier, Jr. | |
| 1,701,935 A | 2/1929 | Ryan | |
| 1,702,888 A | 2/1929 | Balch | |
| 1,742,438 A | 1/1930 | D'Olier, Jr. | |
| 1,796,036 A | 3/1931 | Mangin | 248/343 |
| 2,349,924 A | 5/1944 | Anderson | |
| 2,355,913 A | 8/1944 | Simon | 173/328 |
| 2,414,173 A | 1/1947 | Schuman | 174/52 |
| 2,547,896 A | 4/1951 | Wellen | 230/241 |
| 2,671,821 A | 3/1954 | Zientowski et al. | 174/54 |
| 2,766,434 A | 10/1956 | Gear | 339/122 |
| 2,933,240 A | 4/1960 | Breese | 230/259 |
| 2,941,178 A | 6/1960 | Hubbell et al. | 439/333 |
| 2,990,153 A | 6/1961 | Wolar | 248/343 |
| 3,017,469 A | 1/1962 | Giller | 200/52 |
| 3,302,918 A | 2/1967 | Cohen | 248/343 |
| 3,356,840 A | 12/1967 | Cohen | 240/78 |
| 3,401,874 A | 9/1968 | Covington | 230/241 |
| 3,523,267 A | 8/1970 | Pauza | 439/333 |
| 3,725,840 A | 4/1973 | Hesse | 339/14 R |
| 3,798,584 A * | 3/1974 | Person | 439/102 |
| 3,894,781 A * | 7/1975 | Donato | 439/121 |
| 4,098,547 A | 7/1978 | Wrobel | 339/91 R |
| 4,160,576 A | 7/1979 | Vettori | 339/119 R |
| 4,357,506 A | 11/1982 | Breining | 200/52 R |
| 4,402,649 A | 9/1983 | Laurel | 416/5 |
| 4,403,824 A | 9/1983 | Scott | 339/186 R |
| 4,448,388 A | 5/1984 | Dennis et al. | 248/663 |
| 4,515,538 A | 5/1985 | Shih | 417/572 |
| 4,531,796 A | 7/1985 | Gansert et al. | 439/321 |
| 4,548,554 A | 10/1985 | Angott | 417/572 |
| D283,156 S | 3/1986 | Mandelli et al. | D23/158 |
| 4,637,673 A | 1/1987 | Yang | 339/89 M |
| 4,645,286 A * | 2/1987 | Isban et al. | 439/571 |
| 4,645,289 A * | 2/1987 | Isban | 439/101 |
| 4,711,161 A | 12/1987 | Swin, Sr. et al. | 98/31.5 |
| 4,721,480 A * | 1/1988 | Yung | 439/527 |
| 4,725,240 A | 2/1988 | Braverman | 439/105 |
| 4,729,725 A | 3/1988 | Markwardt | 417/423 R |
| 4,776,761 A | 10/1988 | Diaz | 416/5 |
| 4,788,383 A | 11/1988 | Caison | 174/54 |
| 4,808,071 A | 2/1989 | Chau | 416/5 |
| 4,810,207 A | 3/1989 | Butterfield | 439/529 |
| 4,880,128 A | 11/1989 | Jorgensen | 220/3.9 |
| 4,884,947 A | 12/1989 | Rezek | 416/5 |
| 4,919,292 A | 4/1990 | Hsu | 220/3.2 |
| 4,929,187 A * | 5/1990 | Hudson et al. | 439/334 |
| 4,952,157 A | 8/1990 | Hudson et al. | 439/92 |
| 4,988,067 A | 1/1991 | Propp et al. | 248/343 |
| 5,069,601 A | 12/1991 | Shawcross | 417/360 |
| 5,072,341 A | 12/1991 | Huang | 362/96 |
| 5,090,654 A | 2/1992 | Ridings et al. | 248/343 |
| 5,094,676 A | 3/1992 | Karbacher | 55/316 |
| 5,108,260 A | 4/1992 | Monrose, III et al. | 416/142 |
| RE34,147 E | 12/1992 | Rezek | 416/5 |
| 5,180,284 A | 1/1993 | Monrose, III et al. | 416/204 R |
| 5,242,269 A | 9/1993 | Chang | 416/244 |
| 5,376,020 A | 12/1994 | Jones | 439/537 |
| 5,383,765 A | 1/1995 | Baxter et al. | 416/62 |
| 5,403,198 A * | 4/1995 | Koganemaru et al. | 439/333 |
| 5,421,701 A | 6/1995 | Funston | 415/5 |
| 5,507,619 A | 4/1996 | Ryan | 416/5 |
| 5,558,537 A | 9/1996 | Su | 439/537 |
| 5,567,117 A | 10/1996 | Gunn et al. | 416/244 R |
| 5,568,968 A | 10/1996 | Jaramillo | 362/376 |
| 5,586,867 A | 12/1996 | Mehlos | 417/45 |
| 5,658,129 A | 8/1997 | Pearce | 416/5 |
| 5,714,963 A * | 2/1998 | Cox | 343/786 |
| 5,738,437 A | 4/1998 | Ilagan | 362/363 |
| 5,738,496 A | 4/1998 | Mehta | 417/44.1 |
| 5,762,223 A | 6/1998 | Kerr, Jr. | 220/3.9 |
| 5,800,049 A | 9/1998 | Todd, Jr. | 362/294 |
| 5,845,988 A | 12/1998 | Mandall | 362/376 |
| 5,860,548 A | 1/1999 | Kerr, Jr. | 220/3.2 |
| 5,893,628 A | 4/1999 | Byers | 362/252 |
| 5,900,583 A | 5/1999 | Russo | 174/61 |
| 5,951,197 A | 9/1999 | Wu | 403/315 |
| 5,951,253 A | 9/1999 | Gajewski | 416/214 |
| 5,954,304 A | 9/1999 | Jorgensen | 248/200.1 |
| 5,954,449 A | 9/1999 | Wu | 403/315 |
| 5,963,432 A | 10/1999 | Crowley | 361/804 |
| 5,984,640 A | 11/1999 | Wang | 416/244 R |
| 6,036,154 A | 3/2000 | Pearce | 248/343 |
| 6,038,130 A | 3/2000 | Boeck et al. | 361/735 |
| 6,146,191 A * | 11/2000 | Kerr et al. | 439/537 |
| 6,171,061 B1 | 1/2001 | Hsu | 416/244 R |
| 6,322,232 B1 | 11/2001 | Oliver | 362/147 |
| 6,325,654 B1 | 12/2001 | Kerr, Jr. et al. | 439/313 |
| 6,335,486 B1 | 1/2002 | Reiker | 174/51 |
| 6,364,612 B1 | 4/2002 | Tseng | 416/210 R |

\* cited by examiner

QUICK CONNECT DEVICE FOR ELECTRICAL FIXTURE

CROSS-REFERENCE TO RELATED APPLICATIONS

This application is a continuation in part of U.S. patent application Ser. No. 10/156,919, filed May 28, 2002 now U.S. Pat. No. 6,503,099, which claims benefit of U.S. provisional patent application No. 60/295,186, filed Jun. 1, 2001. Both of those applications are herein incorporated in their entirety.

FIELD OF THE INVENTION

The field of the invention is electrical fixtures, and especially the overhead mounting of lighting fixtures, fans, and the like.

BACKGROUND OF THE INVENTION

The installation of a conventional ceiling fan or pendant ceiling lamp is a difficult task for a single installer. To install a conventional ceiling fan, the installer, or preferably one of a team of installers, lifts the fan to just below an electrical junction box set into the ceiling, and holds it there while connecting the fan wires to the electrical supply wires. After finishing the electrical connection, the installer lifts the fan further to place the fan bell over the junction box and holds it in that position while attaching the fan is to the box or a ceiling hanger in some manner, typically with screws or bolts. The combined operation takes several minutes and usually requires two persons, one to lift and hold the fan and the other to make the wire and screw connections.

SUMMARY OF THE INVENTION

The current invention is a quick-connect device for hanging fans, lighting fixtures, and the like. A horizontal sliding connector is provided between the ceiling box and the electrical fixture. The sliding connector takes the weight of the fixture as it is inserted, which can be done by one person. The part of the sliding connector attached to the electrical fixture is supported above the fan bell or canopy by one or more standoffs. The electrical connections are established by a plug-and-receptacle connector positioned to engage automatically as the sliding connector slides into place. The bell or canopy is then raised into position covering the sliding connector. Thus, the installer never needs to support the weight of the ceiling fixture while working on screw or wire connections.

In one aspect of the invention the standoffs are retained in the extended position by friction sufficient to support the weight of the second support member.

In another aspect of the invention one or more screws for securing the bell are captive within the standoffs.

In a third aspect of the invention the standoffs have a central hole for a screw, and the first support member has holes positioned to receive screws going through the central holes of the standoffs, so arranged that the screws can secure the bell to the first support member when the first and second support members are in their mating position.

As can be seen from the description and Figures contained herein, hanging a fan or lighting fixture, particularly a heavy one, can be rendered a simple task using the quick connect device of this application.

BRIEF DESCRIPTION OF THE DRAWINGS

For purposes of illustrating the invention, the drawings show one or more forms in which the invention can be embodied. The invention is not, however, limited to the precise forms shown unless such limitation is expressly made in a claim. In the drawings:

DETAILED DESCRIPTION OF THE DRAWINGS

Figure 1:
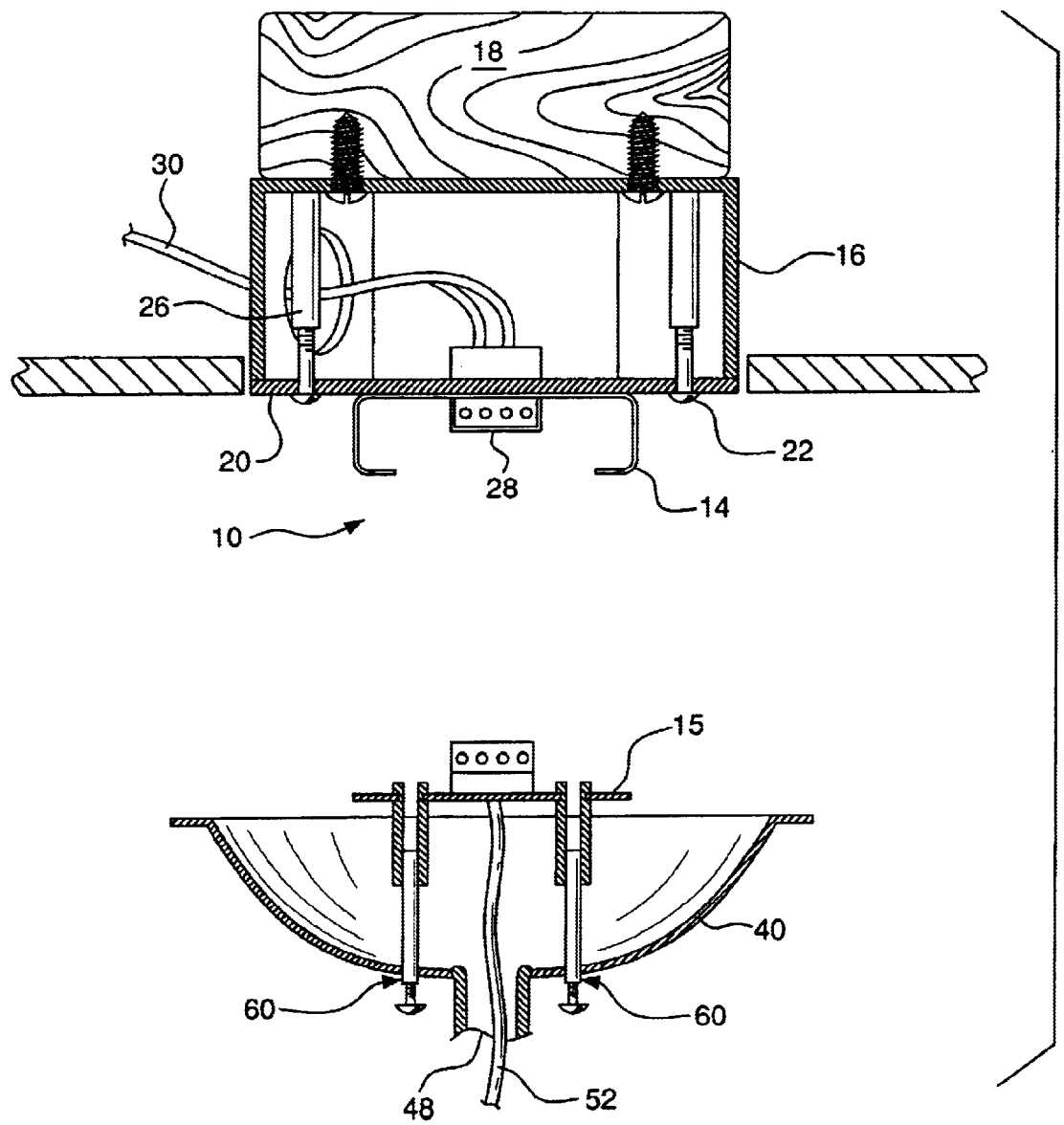
FIG. 1 is a schematic sectional view from one end of one embodiment of the quick connect device.

Referring to the drawings, one form of quick connect device according to the invention comprises a mounting assembly indicated generally by the reference numeral 10 and a hanging assembly indicated generally by the reference numeral 12. The mounting assembly 10 of the quick connect device comprises a first support member in the form of a mounting slide 14, and the hanging assembly 12 of the quick connect device comprises a second support member in the form of a hanging slide 15. The mounting slide 14 is shown as being bent from sheet metal, in C-shaped cross section, defining a channel open downwards. The hanging slide 15 is shown as a flat plate. The slides 14 and 15 are shaped and dimensioned so that the hanging slide 15 will slide into and along the channel of the mounting slide 14, fitting snugly but without binding.

Figure 2:
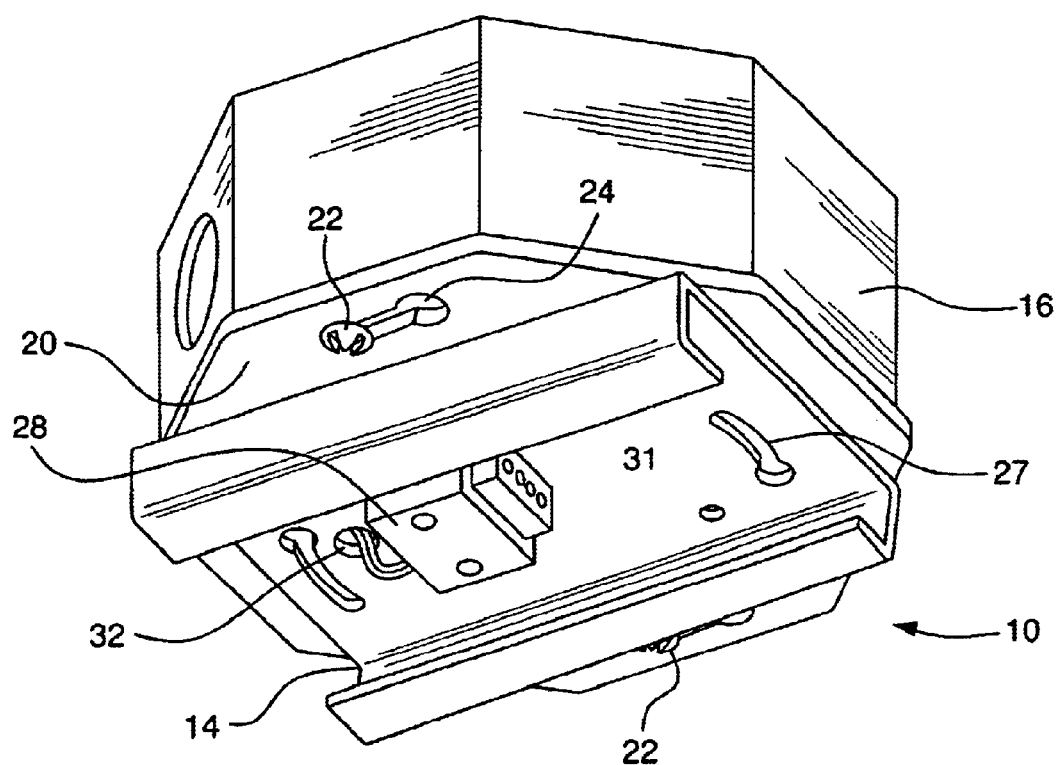
FIG. 2 is a perspective view from below of an upper part of the quick connect device shown in FIG. 1.

The mounting slide 14 is shown attached to an electrical box 16, which is in turn attached to a ceiling joist 18. As shown in FIG. 2, the mounting slide 14 is fixed to a cover plate 20 that is dimensioned to cover the open underside of the electrical box 16. The cover plate 20 is then screwed to the ceiling box 16, for example, by screws 22 that pass through holes or keyhole slots 24 in the cover plate 20 and screw into internally threaded posts 26 that are provided in standard load-bearing ceiling boxes. Alternatively, the mounting slide 14 may be mounted directly onto the ceiling box 16, for example, by the screws 22 passing through holes or keyhole slots 27 in the mounting slide 14 and screwing into the internally threaded posts 26. For ease of assembly, the stems of the keyhole slots 24 and/or 27 are preferably arcs of a common circle.

An electrical connector 28, which will be further discussed below, is mounted within the mounting slide 14. The electrical connector 28 is connected to wiring 30 that supplies power to the electrical box 16 from within the building. The mounting slide 14 is also provided with a pair of threaded bores 31, which will be further discussed below. The wiring 30 may be connected to the connector 28 (or to stub wires extending from the connector 28) within the electrical box 16 before the cover plate 20 is screwed into place. Alternatively, the wiring 30 may be led through a hole 32 in the mounting slide 14 and connected to the connector 28 within the channel of the mounting slide 14. The mounting assembly of the quick connect device will normally be completely connected to the ceiling, both electrically and mechanically, before the electrical fixture that is to be attached to the ceiling is involved. Although FIG. 2 shows the mounting slide fixed to the ceiling box 16 in isolation, the ceiling box will, of course, usually be fixed to the joist 18 before the mounting slide 14 is attached.

Figure 3:
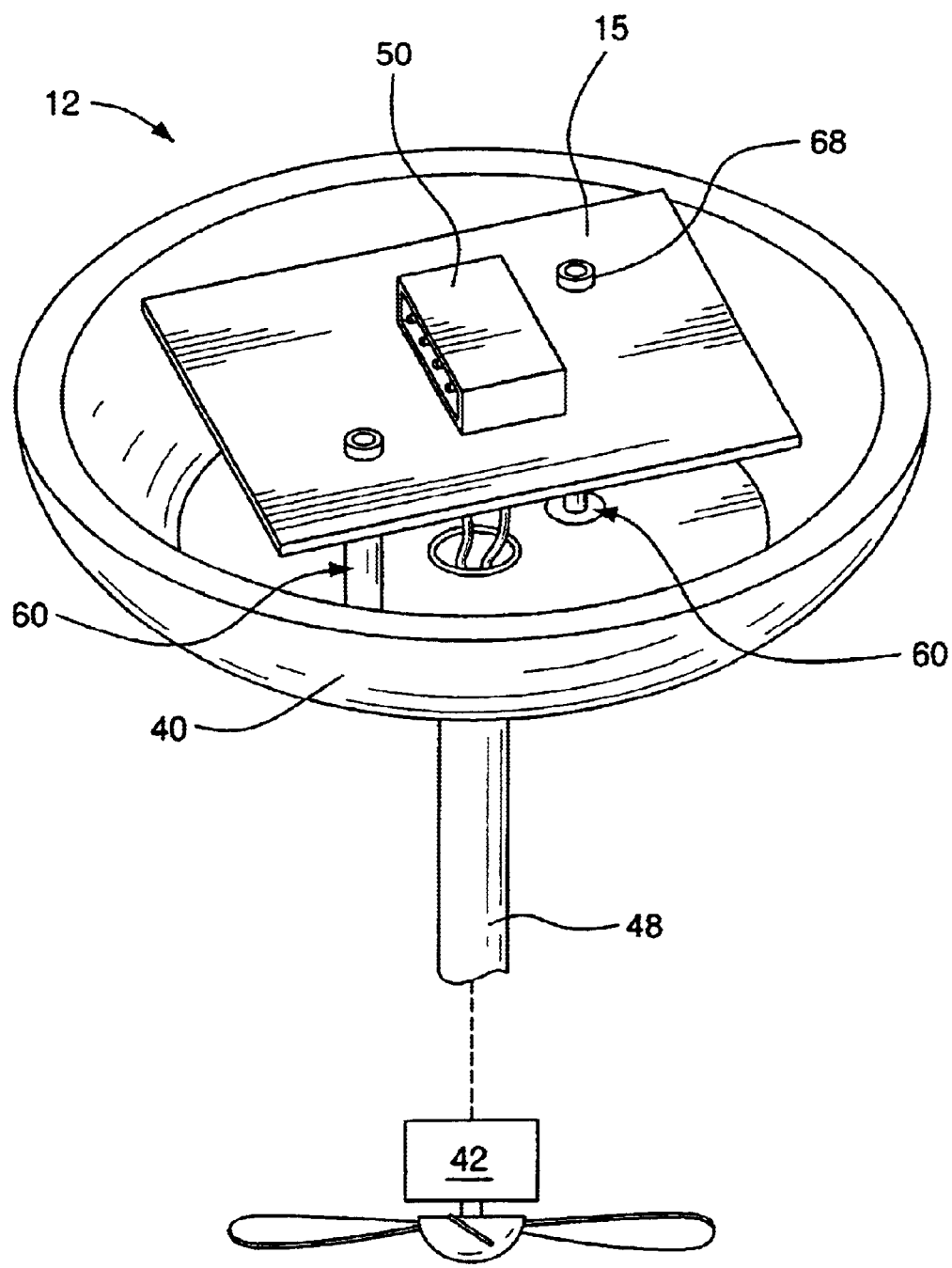
FIG. 3 is a perspective view from above of a lower part of the quick connect device shown in FIG. 1.

Referring now especially to FIG. 3, the hanging slide 15 is attached to a bell 40, to which a ceiling lamp, fan or other appliance 42 is attached. As shown in FIG. 3, the appliance 42 may be a lamp or fan suspended solely from the central shaft 48, in which case a ball mounting (not shown) may be provided between the bell 40 and the shaft 48. Instead, the appliance 42 may be a light fixture with a bowl or other structure attached to the bell 40 by arms instead of, or in addition to, the central shaft 48. Various forms of appliance, and various means of attaching an appliance to a bell, are well known in the art and may be substituted for the specific examples shown and described.

An electrical connector 50 is mounted on the hanging slide 15. Wires 52 from the connector 50 lead down, for example, through the interior of the shaft 48, to the electrically powered or controlled parts of the appliance 42. The respective connectors 28 and 50 form the two halves of a plug-and-receptacle connection, and are so positioned on their respective slides 14, 15 that as the hanging slide is slid into the mounting slide the connectors are brought together to form a proper electrical connection between plug and receptacle. Because the appliance 42 may be mounted or dismounted, by means of the quick-connect mounting, without the power supply to the ceiling box being shut off, it is preferred that the upper connector 28 be the receptacle, unless it is a shrouded or shielded plug.

Figure 4:
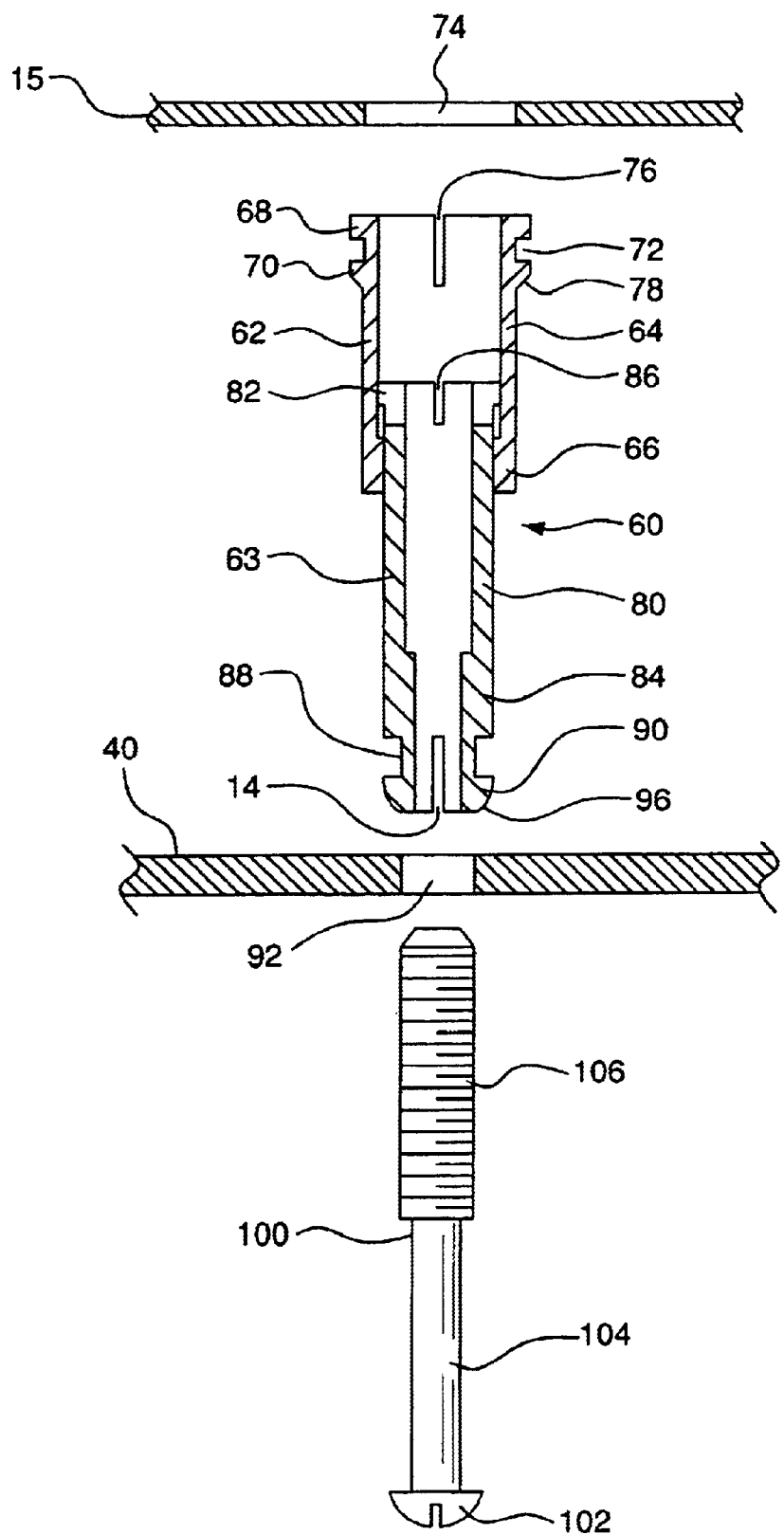
FIG. 4 is a partly exploded section through a standoff forming part of the lower part of the quick connect device shown in FIGS. 1 and 3.

Referring especially to FIG. 4, the hanging slide 15 is attached to the bell 40 by a pair of standoffs indicated generally by the reference numeral 60. Each standoff comprises an upper part 62 and a lower part 63. The parts of the standoff are preferably machined or molded from a suitable plastic material. Suitable materials and methods of manufacture are well known in the art. The positioning of the standoffs 60 matches that of the threaded bores 31 in the mounting slide 14. More standoffs than two may be used for greater strength or stability. Using only a single standoff is possible, but not usually preferred.

The upper part 62 of each standoff consists primarily of a tube 64. At the lower end, the inner diameter of the tube 64 is reduced by a shoulder 66. The inner diameter of the tube 64 may be slightly tapering and, if so, it is narrowest at the lower end next to the shoulder 66. At the upper end of the tube 64, the upper part 62 of the standoff has two external flanges 68 and 70, separated by a groove 72. The groove 72 is dimensioned, in both height and diameter, to engage snugly the periphery of a hole 74 formed in the hanging slide 15. In order to enable the upper part 62 to be inserted into the hole 74, the upper part is provided with vertical slots 76 (preferably 2 in number) that allow it to compress radially against the intrinsic resilience of the plastic material. The lower face of the lower flange 70 is formed as a beveled surface 78 that provides a wedging action, compressing the tube 64 as it is inserted into the hole 74 from above. The upper part 62 of the standoff then locks onto the rim of the hole 74 with a snap action as the groove 72 aligns with the rim.

The lower part 63 of the standoff comprises a tube 80, with an external flange 82 at its upper end and an internal shoulder 84 at its lower end. The shoulder 84 defines a bore narrower than the interior of the main part of the tube 80. The external flange 82 is dimensioned to be a friction fit within the tube 64 of the upper part 62 of the standoff, at least when the flange 82 is close to the shoulder 66. Abutment between the flange 82 and the shoulder 66 prevents the upper end of the lower part 63 from passing through the lower end of the upper part 62. The top end of the lower part 63 may be provided with slots 86 (preferably 4 in number) to make it more compressible radially and thus make the frictional engagement less critically dependent on the exact dimensions of the components. The tube 80 of the lower part 63 of the standoff is longer than the upper part 62, as will be explained below.

The lower end of the lower part 63 of the standoff is formed with an external groove 88 bounded by a lower flange 90. The groove 88 is dimensioned, in both width and diameter, to engage snugly the periphery of a hole 92 formed in the bell 40. In order to enable the lower part 63 to be inserted into the hole 92, it is provided with vertical slots 94 (preferably 2 in number) that allow it to compress radially against the intrinsic resilience of the plastic material. The lower end face of the lower part 63, including the lower face of the flange 90, is formed as a beveled surface 96 that provides a wedging action, compressing the tube 80 as it is inserted into the hole 92 from above. The lower part 63 of the standoff then locks onto the rim of the hole 92 with a snap action as the groove 88 aligns with the rim.

A screw 100 is inserted into the inside of the lower part 63 of the standoff 60. The screw 100 has a head 102, a bare shank 104, and a threaded tip 106. The threads of the tip 106 match the threading of the bores 31 in the mounting slide 14. The shank 104 is narrower than the bore defined within the shoulder 84, and longer than the shoulder 84. The clearance diameter of the threaded tip is wider than the diameter within the shoulder 84, but narrower than the internal diameter of the tube 80 above the shoulder 84. The head 102 is wider than the hole 92 in the bell 40. For reasons that will be explained below, the screw 100 is longer than the lower part 63 of the standoff, but the shank 104 is shorter than the lower part 63, and the threaded tip 106 is preferably shorter than the tube 80 above the shoulder 84.

Thus, when the screw is inserted into the standoff 60, with the shank 104 within the shoulder 84, it is captive but loose. In its lowest position the threaded tip 106 is entirely shrouded within the tube 80, and in its highest position the head 100 bears against the end face 96 while only the threaded tip 106 projects from the upper end of the standoff. The screws 100 may be inserted into the standoff 60 after the lower part is snapped onto the bell 40, by screwing the threaded tip 106 through the shoulder 84. Instead, the screws 100 may be sprung into the lower part 63 before the lower part is snapped into the hole 92, provided that the shank 104 of the screw is narrow enough not to block the necessary compression of the slots 94 as the lower part 63 is snapped into the hole 92.

In use, each standoff 60 is assembled, with its lower part 63 within its upper part 62, and its screw 100 within its lower part 63. The hanging assembly 12 is assembled with the grooves 72 in the upper parts 62 of the standoffs snapped onto respective holes 74 in the hanging slide 15, the grooves 88 in the lower parts 63 of the standoffs snapped onto the holes 92 in the bell 40, and the screws 100 loosely captive within the standoffs.

The hanging assembly 12 of the quick connect device may be assembled to the bell 40 by the fixture manufacturer or may be assembled by the installer. However, even if it is assembled on site, that assembly can be completed with the fixture 42 supported on the floor or a table or bench. In either case, the installer fully extends the standoffs 60, as shown in FIG. 1. In that position, the hanging slide 15 is above the rim of the bell 40. The frictional grip between the flanges 82 and the insides of the tubes 64 must then be sufficient that the hanging slide 15 is reliably supported, but not so great that the installer cannot later telescope the standoffs against the frictional resistance by a moderate upward force on the hanging assembly 12 that will not overload any other part of the assembly.

The fixture 42, with the hanging assembly 12 of the quick connect device, is then raised by hand until the hanging slide 15 is lined up so that it slidably engages the mounting slide 14. The channels 14, 15 must be aligned so that the plug 50 will engage the receptacle 28. Stops (not shown) may be provided to prevent the wrong ends of the mounting slides 14, 15 from being slid together. Once the plug 50 and receptacle 28 are properly engaged, electrical current can pass through the plug/receptacle connection from the wires 30 in the electrical box 16 to the wires 52 in the fixture. The fully-engaged position of the plug and receptacle 50, 28 determines the alignment of the bell 40 and the fixture 42, correctly centered below the ceiling box 16. In this position, the standoffs 60 of the hanging assembly 12 must be coaxial with the bores 31 in the mounting slide 14. Geometric perfection is not required, but they must be close enough that the installer can easily insert the screws into the threaded bores when the bores are no longer visible.

Once the plug 50 and receptacle 28 are engaged, the bell 40 is supported by the mounting slides 14, 15, but is still below the normal plane of the ceiling as shown in FIG. 1: electrical boxes 16 are usually installed so that the face plate 20 is flush with the ceiling. The installer then raises the bell 40 and the fixture 42 until the rim of the bell 40 is in contact with the ceiling. This allows the final position of the bell to be adjusted to accommodate a difference in height or angle between the face plate 20 and the ceiling.

Because the lower parts 63 of the standoffs 60 are snapped onto the bell 40, they are raised with the bell 40. Preferably, in the final position of the bell 40, the upper ends of the lower parts 63 of the standoffs 60 project above the top end flanges 68 of the upper parts 62, and come close to the threaded bores 31 in the mounting slide 14. The lower parts 63 then act as guides to assist in aligning the screws 100 with the bores 31. The installer then inserts the screws 100 into the bores 31 and tightens them. The bottom flanges 90 of the standoffs then act as plastic washers between the heads 102 of the screws 100 and the bell 40.

It will be seen from the above description that the exact longitudinal dimensions of the parts of the standoff 60 are not critical, provided that when the bell 40 is raised the bottom end of the upper part 62 does not foul the inside of the bell, and neither the top end of the lower part 63 nor the tip of the screw 100 fouls the mounting slide 14, and provided that the screw 100 has a sufficient threaded length to assure, reliable fastening of the bell 40 to the mounting slide 14. As described above, the primary load-bearing mounting for the fixture 40 passes through the hanger rod 48, the bell 40, the screws 100, the mounting slide 14, and the screws 22 to the ceiling box 16. If it is preferred not to rely entirely on the screws 100, an alternative attachment may be provided, for example, by horizontal pins or screws joining the rim of the bell 40 to the ends of the mounting slide 14.

Once the light fixture is flush to the ceiling, final connections, if not already made, can be performed within the fixture 42. Rough installation of the fixture 42 is then complete.

The present invention may be embodied in still further specific forms without departing from the spirit or essential attributes thereof and, accordingly, reference should be made to the appended claims, rather than to the foregoing specification, as indicating the scope of the invention. In particular, although one distinct embodiment has been described and illustrated, it will be apparent to those skilled in the art how features may be combined and interchanged in various ways, only some of which have been specifically mentioned above.

For example, although the mounting slide 14 is shown as a channel and the hanging slide 15 as a flat plate, the hanging slide 15 could instead be an upwardly-open channel fitting within the channel 14, or the hanging slide 15 could be an upwardly-open channel and the mounting slide could fit within it. It is preferred for the mounting slide 14 to be a channel, because it then acts as a protective shroud round the electrical connector 28 if the ceiling fixture 42 is removed for any reason.

For example, if the bell 40 is sufficiently wide compared with the length of the channels 14 and 15, the sliding connection may be carried out with the channels inside the lip of the bell. It is not then necessary for the hanging slide 15 to be raised entirely above the rim of the bell 40. However, it may still be preferred for the hanging slide 15 to be raised entirely above the rim of the bell 40, in order to improve the installer's view of the sliding connection.

The fixture or appliance 42 has been described as attached solidly to the bell 40, with the hanging slide 15 supported above the bell by the standoffs 60. Instead, the fixture or appliance 42 could be attached solidly to the hanging slide 15 with the bell 40, supported below the hanging slide 15 by the standoffs 60. The weight of the fixture or appliance 42 would then be supported primarily by the sliding connection between the mounting slide 14 and the hanging slide 15, with the screws 100 serving to lock the sliding connection in its mating position and to secure the bell 40.

The present embodiment of the invention has been described in the context of mounting an appliance or fixture 42 on the underside of a horizontal ceiling, and terms such as "upper" and "lower" have been used accordingly. It will be understood, however, that the quick connect device of the invention may be used to mount fixtures or appliances in other contexts and orientations, and that when not in use, the device may be stored in any orientation. Consequently, the terminology used should not be understood as in any way limiting the orientation of the device. It will also be understood that terms such as "bore" used to describe a tubular passage do not require the passage to be formed by a drilling operation, when casting, extrusion, rolling, or other production methods will give a satisfactory result.

What is claimed is:

1. A quick connect device for suspended electrical devices, comprising:

a first support member having a first electrical connector, and being adapted to be attached to an electrical ceiling box;

a second support member, dimensioned to slide along and be guided by the first support member into a position mating with said first support member, bearing a second electrical connector, and being adapted to be attached to and support an electrical device, said first and second connectors so positioned as to mate when the second support member is in said mating position;

a bell adapted to be secured in a position covering said support members when said support members are in mating position; and at least one standoff extending between the bell and the second support member and movable between an extended position in which it supports the second support member above the bell for mating with the first support member and a contracted position;

wherein the standoff is retained in the extended position by friction sufficient to support the weight of the second support member.

2. A quick connect device according to claim 1, wherein the friction is generated by a resilient first part of the standoff, attached to one of the bell and the second support member, slidably engaging a second part of the standoff, attached to the other of the bell and the second support member.

3. A quick connect device according to claim 1, wherein a screw for securing the bell is captive within the at least one stand-off.

4. A quick connect device according to claim 3, wherein a lower part of said at least one standoff has a narrowed diameter engaging a shank of the screw.

5. A quick connect device according to claim 1, wherein said at least one standoff has a central hole for a screw, and said first support member has at least one hole positioned to receive at least one screw going through said central hole of said at least one standoff, so arranged that said at least one screw can secure said bell to said first support member with said first and second support members in said mating position.

6. A quick connect device according to claim 5, wherein in the contracted position of the standoff with said first and second support members in mating position a part of said at least one standoff attached to the bell extends through the second support member into proximity with said at least one hole.

7. A quick connect device for suspended electrical devices, comprising:
   a first support member having a first electrical connector, and being adapted to be attached to an electrical ceiling box;
   a second support member, dimensioned to slide along and be guided by the first support member into a position mating with said first support member, bearing a second electrical connector, and being adapted to be attached to and support an electrical device, said first and second connectors so positioned as to mate when the second support member is in said mating position;
   a bell adapted to be secured in a position covering said support members when said support members are in mating position; and
   at least one stand-off extending between the bell and the second support member and movable between an extended position in which it supports the second support member above the bell for mating with the first support member and a contracted position;
   wherein a screw for securing the bell is captive within the at least one stand-off.

8. A quick connect device according to claim 7, wherein a lower part of said at least one standoff has a narrowed diameter engaging a shank of the screw.

9. A quick connect device according to claim 7, wherein the first support member has at least one hole positioned to receive said at least one screw, so arranged that said at least one screw can engage in said hole to secure said bell to said first support member with said first and second support members in mating position.

10. A quick connect device according to claim 7, wherein in the contracted position of the standoff with said first and second support members in said mating position a part of said at least one standoff attached to the bell extends through the second support member and is in proximity with and aligned with said at least one hole.

11. A quick connect device for suspended electrical devices, comprising:
   a first support member having a first electrical connector, and being adapted to be attached to an electrical ceiling box;
   a second support member, dimensioned to slide along and be guided by the first support member into a position mating with said first support member, bearing a second electrical connector, and being adapted to be attached to and support an electrical device, said first and second connectors so positioned as to mate when the second support member is slid into mating position;
   a bell adapted to be secured in a position covering said support members when said support members are in mating position; and
   at least one stand-off extending between the bell and the second support member and movable between an extended position in which it supports the second support member above the bell for mating with the first support member and a contracted position;
   wherein the at least one standoff has a central hole for a screw, and the first support member has at least one hole positioned to receive at least one screw going through the central hole of the at least one standoff, so arranged that said at least one screw can secure said bell to said first support member with said first and second support members in mating position.

12. A quick connect device according to claim 11, wherein in the contracted position of the standoff, with said first and second support members in mating position, a part of said at least one standoff attached to the bell extends through the second support member towards said at least one hole.

13. A ceiling mountable electrical device, comprising:
   a first mounting member adapted to be attached to and project from a ceiling;
   a second mounting member attached to the device, said mounting members arranged to mate by horizontal sliding movement of the device and the second mounting member when the first mounting member is attached to a ceiling; and
   first and second electrical connectors on the first and second mounting members, positioned to mate when the first and second mounting members mate, the first electrical connector being adapted to be connected to an electrical supply in the ceiling and the second electrical connector being electrically connected to the device;
   whereby the device can be electrically and mechanically attached to the ceiling by a single horizontal sliding movement;
   a bell attached to the device and adapted to be secured in a position covering said support members when said support members are in mating position; and
   at least one standoff extending between the bell and the second support member and movable between an extended position in which it supports the second support member above the bell for mating with the first support member and a contracted position in which the bell surrounds the first support member when the first and second support members are in mating position;
   wherein the standoff is retained in the extended position by friction sufficient to support the weight of the second support member.

14. A ceiling mountable electrical device according to claim 13, wherein the friction is generated by a resilient first part of the standoff, attached to one of the bell and the second support member, slidably engaging a second part of the standoff, attached to the other of the bell and the second support member.

15. A ceiling mountable electrical device according to claim 13, wherein a screw for securing the bell is captive within the at least one stand-off.

16. A ceiling mountable electrical device according to claim 15, wherein a lower part of said at least one standoff has a narrowed diameter engaging a shank of the screw.

17. A ceiling mountable electrical device according to claim 13, wherein the at least one standoff has a central hole for a screw, and the first support member has at least one hole positioned to receive at least one screw going through the central hole of the at least one standoff, so arranged that said at least one screw can secure said bell to said first support member with said first and second support members in mating position.

18. A ceiling mountable electrical device according to claim 17, wherein in the contracted position of the standoff with said first and second support members in mating position a part of said at least one standoff attached to the bell extends through the second support member into close proximity with said at least one hole.

19. A ceiling mountable electrical device according to claim 13, which is a device selected from the group consisting of lamps and fans.

20. A ceiling mountable electrical device according to claim 13, wherein the device is attached to the bell, and is attached to the second support member through the bell and the at least one standoff.

21. A ceiling mountable electrical device according to claim 13, wherein said first support member is fixed to a cover plate adapted to be fastened to an electrical ceiling box.

22. A ceiling mountable electrical device according to claim 20, wherein in the contracted position of said at least one standoff, with the first and second support members in mating position, the bell is arranged to be positioned against a ceiling in which the electrical ceiling box is installed.

23. A ceiling mountable electrical device, comprising:
a first mounting member adapted to be attached to and project from a ceiling;
a second mounting member attached to the device, said mounting members arranged to mate by horizontal sliding movement of the device and the second mounting member when the first mounting member is attached to a ceiling; and
first and second electrical connectors on the first and second mounting members, positioned to mate when the first and second mounting members mate, the first electrical connector being adapted to be connected to an electrical supply in the ceiling and the second electrical connector being electrically connected to the device;
whereby the device can be electrically and mechanically attached to the ceiling by a single horizontal sliding movement;
a bell attached to the device and adapted to be secured in a position covering said support members when said support members are in mating position; and
at least one standoff extending between the bell and the second support member and movable between an extended position in which it supports the second support member above the bell for mating with the first support member and a contracted position in which the bell surrounds the first support member when the first and second support members are in mating position; wherein at least one screw for securing the bell is captive within the at least one stand-off.

24. A ceiling mountable electrical device according to claim 22, wherein a lower part of said at least one standoff has a narrowed diameter engaging a shank of the screw.

25. A ceiling mountable electrical device according to claim 22, wherein the first support member has at least one hole positioned to receive said at least one screw, so arranged that said at least one screw can secure said bell to said first support member with said first and second support members in mating position.

26. A ceiling mountable electrical device according to claim 22, wherein in the contracted position of the standoff with said first and second support members in mating position a part of said at least one standoff attached to the bell extends through the second support member into close proximity with said at least one hole.

27. A ceiling mountable electrical device, comprising:
a first mounting member adapted to be attached to and project from a ceiling;
a second mounting member attached to the device, said mounting members arranged to mate by horizontal sliding movement of the device and the second mounting member when the first mounting member is attached to a ceiling; and
first and second electrical connectors on the first and second mounting members, positioned to mate when the first and second mounting members mate, the first electrical connector being adapted to be connected to an electrical supply in the ceiling and the second electrical connector being electrically connected to the device;
whereby the device can be electrically and mechanically attached to the ceiling by a single horizontal sliding movement;
a bell attached to the device and adapted to be secured in a position covering said support members when said support members are in mating position; and
at least one standoff extending between the bell and the second support member and movable between an extended position in which it supports the second support member above the bell for mating with the first support member and a contracted position in which the bell surrounds the first support member when the first and second support members are in mating position;
wherein the at least one standoff has a central hole for a screw, and the first support member has at least one hole positioned to receive at least one screw going through the central hole of the at least one standoff, so arranged that said at least one screw can secure said bell to said first support member with said first and second support members in mating position.

28. A ceiling mountable electrical device according to claim 26, wherein in the contracted position of the standoff, with said first and second support members in mating position, a part of said at least one standoff attached to the bell extends through the second support member into close proximity with said at least one hole.

* * * * *